No. 813,424.

PATENTED FEB. 27, 1906.

H. HILL.
VEHICLE AXLE MECHANISM.
APPLICATION FILED AUG. 7, 1905.

Witnesses:
Ira D. Perry
J. B. Weir

Inventor:
Hugh Hill.
By Cheever & Cox
Attys

UNITED STATES PATENT OFFICE.

HUGH HILL, OF ANDERSON, INDIANA, ASSIGNOR TO HILL STANDARD MANUFACTURING COMPANY, OF ANDERSON, INDIANA, A CORPORATION OF INDIANA.

VEHICLE-AXLE MECHANISM.

No. 813,424.      Specification of Letters Patent.      Patented Feb. 27, 1906.

Original application filed March 20, 1905, Serial No. 251,045. Divided and this application filed August 7, 1905. Serial No. 273,045.

*To all whom it may concern:*

Be it known that I, HUGH HILL, a citizen of the United States, residing at Anderson, in the county of Madison and State of Indiana, have invented a certain new and useful Improvement in Vehicle - Axle Mechanism, of which the following is a specification.

My invention relates to a novel form of bolster provided with mechanism for preventing the front or steering axle of a child's vehicle from turning too far in the arc of a circle about its pivotal point upon the vehicle.

My invention is particularly applicable for use in children's vehicles, and this is a divisional application of my application for self-propelled vehicles, Serial No. 251,045, filed by me March 20, 1905.

The object of my invention is to provide a novel form of bolster equipped with means for preventing the front or steering axle of a child's vehicle from turning too far around toward the center line of the vehicle, thereby subjecting the mechanism to the danger of upsetting, said bolster being of such a shape that it is out of the way of the child's feet when placed upon the axle for the purpose of guiding the vehicle, as is fully described in my said application, Serial No. 251,045.

It consists in mechanism for accomplishing this object which can be easily and cheaply made and installed, which is efficient in operation, and is not readily liable to get out of order.

Figure 1:
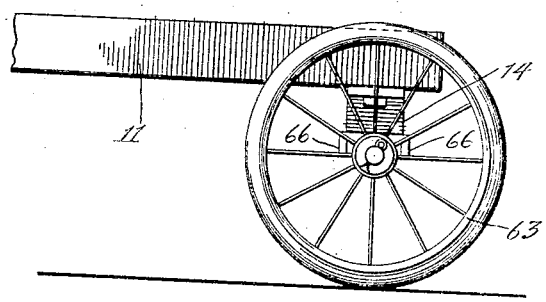
Figure 2:
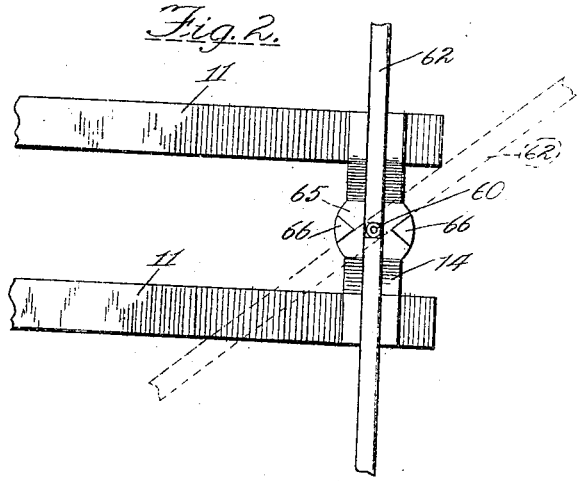
Figure 3:
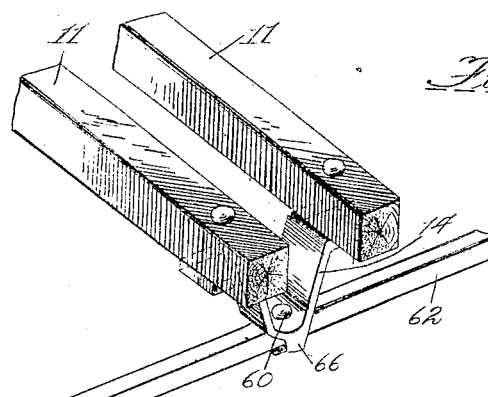

Referring to the drawings, Figure 1 shows a side, Fig. 2 a bottom, and Fig. 3 an end perspective view, of the cart of my said prior application, illustrating the features of the invention here divided out of said application.

Again referring to the drawings, the numeral 11 indicates the longitudinal rods or bars forming the main frames of a child's cart. The front ends of these rods 11 are connected together by a bolster 14, having a U-shaped form, as shown, so that it occupies very little space transversely of the vehicle and is therefore out of the way of the child's feet placed upon the axle 62 to steer the vehicle, as heretofore described, while it is of considerable depth, so that the frame of the vehicle is a sufficient height above the bolster to make the vehicle conveniently operable by the child seated upon or above the frame.

Through the bottom of this U-shaped bolster is placed a king-bolt or pin 60, having loosely journaled upon it the front axle 62. On the opposite ends (beyond the figures in Figs. 2 and 3) are the front wheels 63 of the vehicle. The bottom of this bolster is cut away, as shown in Fig. 2, in the notch or recess 65 large enough to receive this front axle 62, as shown, the remaining portions 66 of the bottom of the bolster forming stops or lugs 66 to limit the horizontal rotation of the axle 62 toward the dotted line of Fig. 2, thereby doing away with the danger of upsets arising from allowing the wheels 63 to swing farther around into the center line of the vehicle. As shown, the lugs 66 lie in the center line of the vehicle.

In the operation of the device the child steers the vehicle by moving the axle 62 backward and forward between the stops 66, but cannot move it beyond them to a position where it is easy to upset the cart.

Having thus described my invention, what I claim as new, and desire to secure by Letters Patent, is—

1. As an article of manufacture, a front bolster for a child's vehicle made U-shaped as described, having one or more lugs extending downward from the bottom thereof adapted to limit the motion of the front axle of the vehicle to which the bolster is applied when said axle is pivotally attached to the bottom of the bolster.

2. As an article of manufacture, a front bolster for a child's vehicle, made U-shaped as described, having two lugs 66 extending downward from the bottom thereof, there being a space between the lugs lying in the center line of the vehicle in which the front axle of said vehicle is adapted to fit and be pivotally mounted on the bolster, substantially as described.

3. In combination, a vehicle-body and running-gear including wheels, front and rear axles and a bolster attached to the front of the vehicle-body and a pivot-pin, said bolster having depending lugs thereon forming stops for limiting the horizontal swing of the front axle, said lugs having substantially vertical acting surfaces and the acting surfaces on opposite sides of the axle-pivot being substantially parallel to each other, said front axle having a flat upper bearing-surface arranged substantially horizontal and having parallel vertical sides, and said bolster having a flat lower bearing-surface bearing directly upon the upper surface of said front axle thereby tending to maintain the axle sides vertical for squarely contacting the vertical acting surfaces of the stop-lugs, and the pivot-pin passing vertically through both bolster and axle to also assist in maintaining the axle sides vertical for squarely contacting the vertical acting surfaces of the stop-lugs.

In witness whereof I have hereunto subscribed my name in the presence of two witnesses.

HUGH HILL.

Witnesses:
   ANNA E. MILLER,
   MARCELLUS A. CHIPMAN.